United States Patent
Kearns et al.

(10) Patent No.: US 9,256,830 B2
(45) Date of Patent: *Feb. 9, 2016

(54) METHOD AND APPARATUS FOR IDENTIFYING STRUCTURAL DEFORMATION

(71) Applicant: The Boeing Company, Chicago, IL (US)

(72) Inventors: Justin D. Kearns, Seattle, WA (US); Manny Salazar Urcia, Jr., Wildwood, MO (US); Christopher Lee Davis, Maple Valley, WA (US); Clarence L. Gordon, III, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,204

(22) Filed: Jan. 13, 2015

(65) Prior Publication Data

US 2015/0347915 A1   Dec. 3, 2015

Related U.S. Application Data

(63) Continuation of application No. 13/418,081, filed on Mar. 12, 2012, now Pat. No. 8,972,310.

(51) Int. Cl.
*G06N 5/04* (2006.01)
*G06N 99/00* (2010.01)

(52) U.S. Cl.
CPC .............. *G06N 5/047* (2013.01); *G06N 99/005* (2013.01)

(58) Field of Classification Search
CPC .................................................... G06N 99/005
See application file for complete search history.

(56) References Cited

U.S. PATENT DOCUMENTS

| | | | |
|---|---|---|---|
| 6,333,712 B1 | 12/2001 | Haugse et al. | |
| 7,046,209 B1 | 5/2006 | McCarville et al. | |
| 7,109,942 B2 | 9/2006 | McCarville et al. | |
| 7,109,943 B2 | 9/2006 | McCarville et al. | |
| 7,113,142 B2 | 9/2006 | McCarville et al. | |
| 2008/0114506 A1* | 5/2008 | Davis et al. | 701/16 |

OTHER PUBLICATIONS

EP search report dated Sep. 11, 2013 regarding application 13158719.8-1951/2648138, reference P56682EP/RGH, applicant The Boeing Company, 7 pages.

(Continued)

*Primary Examiner* — Jeffrey A Gaffin
*Assistant Examiner* — Ola Olude Afolabi
(74) *Attorney, Agent, or Firm* — Yee & Associates, P.C.

(57) ABSTRACT

A method and apparatus for identifying deformation of a structure. Training deformation data is identified for each training case in a plurality of training cases. Training strain data is identified for each training case in the plurality of training cases. The training deformation data and the training strain data are configured for use by a heuristic model to increase an accuracy of output data generated by the heuristic model. A group of parameters for the heuristic model is adjusted using the training deformation data and the training strain data for the each training case in the plurality of training cases such that the heuristic model is trained to generate estimated deformation data for the structure based on input strain data. The estimated deformation data has a desired level of accuracy.

19 Claims, 12 Drawing Sheets

(56) References Cited

OTHER PUBLICATIONS

Foss et al., "Using Modal Test Results to Develop Strain to Displacement Transformations," Proceedings of the 13th International Modal Analysis Conference, SPIE vol. 2460, Feb. 1995, 7 pages.

Mukai et al., "Adaptive Acquisition and Tracking for Deep Space Array Feed Antennas," IEEE Transactions on Neural Networks, vol. 13, No. 5, Sep. 2002, pp. 1149-1162.

Mukai et al., "Computationally Intelligent Array Feed Tracking Algorithms for Large DSN Antennas," TMO Progress Report, May 2000, 16 pages.

Office action dated Jul. 2, 2014 regarding U.S. Appl. No. 13/418,081, 17 pages.

Notice of Allowance dated Oct. 22, 2014 regarding U.S. Appl. No. 13/418,081, 5 pages.

Urcia et al., "Structurally Integrated Phased Arrays," 2011 IEEE Aerospace Conference, Mar. 2011, pp. 1-8.

Ko et al., "Methods for In-Flight Wing Shape Predictions of Highly Flexible Unmanned Aerial Vehicles: Formulation of Ko Displacement Theory," Dryden Flight Research Center, National Aeronautics and Space Administration, NASA/ TO-2010-214656, Aug. 2010, 25 Pages.

Bogert et al., "Structural Shape Identification From Experimental Strains Using a Modal Transformation Technique," 44TH AIAA/ASME/ASCE/AHS Structures, Structural Dynamics, and Material Conference, Apr. 2003, 18 Pages.

Related U.S. Appl. No. 12/693,672, filed Jan. 26, 2010, 88 Pages.

Related U.S. Appl. No. 12/910,825, filed Oct. 24, 2010, 35 Pages.

\* cited by examiner

| ESTIMATED DEFORMATION MEASUREMENTS | | | | | |
|---|---|---|---|---|---|
| ID 402 | SHAPE A 404 | SHAPE B 406 | SHAPE C 408 | SHAPE D 410 | SHAPE E 412 |
| 1 | -0.0753 | 0.0187 | -0.0133 | 0.0657 | 0.0963 |
| 5 | -0.3329 | -0.0940 | 0.1483 | 0.1784 | 0.3891 |
| 9 | -0.0102 | -0.0189 | 0.0103 | 0.0202 | 0.0308 |
| 11 | -0.1868 | 0.0107 | 0.0093 | 0.1350 | 0.2276 |
| 16 | -0.0904 | -0.0577 | 0.0421 | 0.0561 | 0.1087 |
| 18 | -0.1400 | 0.1281 | -0.1456 | 0.1740 | 0.1866 |
| 22 | -0.1712 | -0.0415 | 0.0563 | 0.1014 | 0.2013 |
| 26 | 0.0906 | -0.0510 | -0.0611 | -0.0114 | -0.0882 |
| 28 | -0.1633 | 0.0971 | -0.1031 | 0.1687 | 0.2086 |
| 32 | -0.0258 | -0.0486 | 0.0090 | 0.0298 | 0.0381 |
| 35 | -0.1993 | 0.2503 | -0.3022 | 0.2925 | 0.2733 |
| 39 | -0.0342 | -0.0045 | 0.0019 | 0.0288 | 0.0449 |
| 43 | 0.2303 | -0.0670 | -0.1476 | -0.0419 | -0.2298 |

| ACTUAL DEFORMATION MEASUREMENTS | | | | | |
|---|---|---|---|---|---|
| ID 502 | SHAPE A 504 | SHAPE B 506 | SHAPE C 508 | SHAPE D 510 | SHAPE E 512 |
| 1 | -0.0773 | 0.0195 | -0.0133 | 0.0656 | 0.0939 |
| 5 | -0.3333 | -0.0945 | 0.1496 | 0.1780 | 0.3866 |
| 9 | -0.0131 | -0.0186 | 0.0127 | 0.0212 | 0.0281 |
| 11 | -0.1882 | 0.0100 | 0.0078 | 0.1362 | 0.2235 |
| 16 | -0.0872 | -0.0584 | 0.0456 | 0.0568 | 0.1150 |
| 18 | -0.1427 | 0.1247 | -0.1504 | 0.1739 | 0.1767 |
| 22 | -0.1725 | -0.0416 | 0.0577 | 0.1021 | 0.1996 |
| 26 | 0.0943 | -0.0478 | -0.0531 | -0.0110 | -0.0779 |
| 28 | -0.1653 | 0.0945 | -0.1079 | 0.1685 | 0.2013 |
| 32 | -0.0244 | -0.0489 | 0.0132 | 0.0305 | 0.0428 |
| 35 | -0.2023 | 0.2444 | -0.3139 | 0.2914 | 0.2577 |
| 39 | -0.0351 | -0.0056 | 0.0030 | 0.0293 | 0.0444 |
| 43 | 0.2360 | -0.0668 | -0.1396 | -0.0471 | -0.2101 |

| DIFFERENCE | | | | | |
|---|---|---|---|---|---|
| ID 602 | SHAPE A 606 | SHAPE B 608 | SHAPE C 610 | SHAPE D 612 | SHAPE E 614 |
| 1 | 0.002 | -0.001 | 0.000 | 0.000 | 0.002 |
| 5 | 0.000 | 0.000 | -0.001 | 0.000 | 0.002 |
| 9 | 0.003 | 0.000 | -0.002 | -0.001 | 0.003 |
| 11 | 0.001 | 0.001 | 0.001 | -0.001 | 0.004 |
| 16 | -0.003 | 0.001 | -0.003 | -0.001 | -0.006 |
| 18 | 0.003 | 0.003 | 0.005 | 0.000 | 0.010 |
| 22 | 0.001 | 0.000 | -0.001 | -0.001 | 0.002 |
| 26 | -0.004 | -0.003 | -0.008 | 0.000 | -0.010 |
| 28 | 0.002 | 0.003 | 0.005 | 0.000 | 0.007 |
| 32 | -0.001 | 0.000 | -0.004 | -0.001 | -0.005 |
| 35 | 0.003 | 0.006 | 0.012 | 0.001 | 0.016 |
| 39 | 0.001 | 0.001 | -0.001 | 0.000 | 0.000 |
| 43 | -0.006 | 0.000 | -0.008 | 0.005 | -0.020 |

604

METHOD AND APPARATUS FOR IDENTIFYING STRUCTURAL DEFORMATION

This Application is a continuation of U.S. patent application Ser. No. 13/418,081, filed Mar. 12, 2012, status allowed, the contents of which application are incorporated herein by reference in its entirety.

GOVERNMENT LICENSE RIGHTS

This application was made with United States Government support under United States Air Force AFRL FA8650-08-D-3857 TO 0011 (CCN 9WECY530) awarded by Department of Defense. The United States Government has certain rights in this application.

BACKGROUND INFORMATION

1. Field

The present disclosure relates generally to structural deformation and, in particular, to identifying structural deformation. Still more particularly, the present disclosure relates to a method and apparatus for identifying the deformation of a structure using measured strain data and a heuristic model.

2. Background

Some structures associated with a platform experience deformation during operation of the platform. As used herein, the "deformation" of a structure is any change in the shape of the structure from a reference shape for the structure. Typically, a structure associated with a platform deforms in response to one or more loads being applied to the structure during operation of the platform. Deformation of the structure during operation of the platform may reduce a performance of the structure from a desired level of performance.

As one illustrative example, an antenna system associated with an aircraft may deform in response to a number of loads and/or pressure applied to the antenna system during flight of the aircraft. Deformation of the antenna system reduces performance of the antenna system. In particular, deformation of the antenna system may cause the antenna system to operate outside of selected tolerances.

In one illustrative example, the antenna system may be a phased array antenna system. Deformation of this type of antenna system may affect the electronic beam steering capabilities of the antenna system more than desired. For example, the beam formed by the antenna system may be steered in a direction outside of selected tolerances with respect to a desired direction for the beam. This type of steering may occur when at least a portion of the antenna system deforms. Identifying the amount of deformation experienced by the antenna system can be used to electronically compensate for this deformation.

Some currently available systems for identifying the deformation of a structure associated with a platform include using optical systems, imaging systems, fiber optic systems, coordinate measuring machine (CMM) systems, cameras, and/or other types of devices. These different devices are used to identify the deformation of a structure associated with a platform during operation of the platform.

However, these currently available systems may be unable to identify the deformation of the structure with a desired level of accuracy. Further, these currently available systems for identifying the deformation of a structure may be more complex, time-consuming, and/or expensive than desired. Therefore, it would be desirable to have a method and apparatus that takes into account one or more of the issues discussed above as well as possibly other issues.

SUMMARY

In one illustrative embodiment, a method for identifying deformation of a structure is provided. Training deformation data is identified for each training case in a plurality of training cases. Training strain data is identified for each training case in the plurality of training cases. The training deformation data and the training strain data are configured for use by a heuristic model to increase an accuracy of output data generated by the heuristic model. A group of parameters for the heuristic model is adjusted using the training deformation data and the training strain data for the each training case in the plurality of training cases such that the heuristic model is trained to generate estimated deformation data for the structure based on input strain data. The estimated deformation data has a desired level of accuracy.

In another illustrative embodiment, a method for managing performance of a structure is provided. Training deformation data and training strain data are identified for the structure for each training case in a plurality of training cases. Each training case is configured for use by a heuristic model to increase an accuracy of output data generated by the heuristic model. The structure is configured for association with a platform. A group of parameters for the heuristic model is adjusted using the training deformation data and the training strain data for each training case in the plurality of training cases such that the heuristic model is trained to generate estimated deformation data for the structure based on input strain data. The estimated deformation data has a desired level of accuracy. Strain data for the structure is generated using a sensor system associated with the structure during operation of a platform when the structure is associated with the platform. The estimated deformation data for the structure is generated using the heuristic model and the strain data as the input strain data for the heuristic model. A group of control parameters for the structure is adjusted using the estimated deformation data generated by the heuristic model such that the structure has a desired level of performance during the operation of the platform.

In yet another illustrative embodiment, an apparatus comprises a heuristic model and a trainer. The heuristic model is configured to generate estimated deformation data for a structure based on input strain data. The estimated deformation data has a desired level of accuracy. The trainer is configured to identify training deformation data and training strain data for each training case in a plurality of training cases. The trainer is further configured to train the heuristic model using the training deformation data and the training strain data identified for each training case in the plurality of training cases such that the heuristic model generates the estimated deformation data for the structure with a desired level of accuracy based on the input strain data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a table of actual deformation data in accordance with an illustrative embodiment;

FIG. 6 is an illustration of a table of differences between estimated deformation measurements and actual deformation measurements in accordance with an illustrative embodiment;

DETAILED DESCRIPTION

Figure 1:
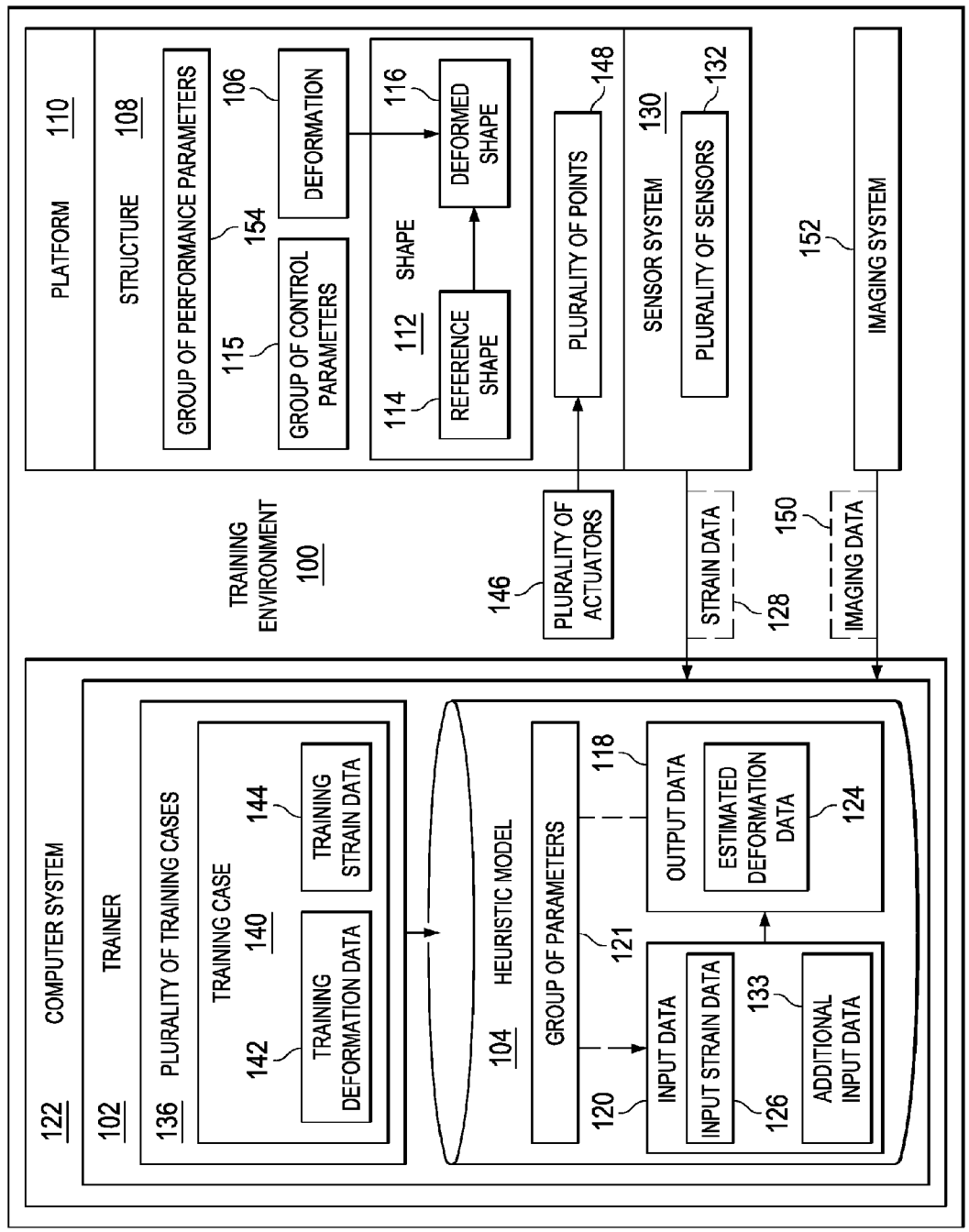
FIG. 1 is an illustration of a block diagram of a training environment in accordance with an illustrative embodiment.

The different illustrative embodiments recognize and take into account one or more different considerations. For example, the different illustrative embodiments recognize and take into account that some currently available systems for measuring the deformation of a structure may not provide a desired level of accuracy. For example, these currently available systems may be unable to provide the level of accuracy needed to compensate for the deformation of the structure.

Optical systems comprising devices, such as, for example, three-dimensional coordinate measuring machine systems, fiber optic systems, cameras, and/or other suitable devices, may be unable to measure the three-dimensional deformation of a structure associated with an aircraft, while in flight, with a desired level of accuracy. The different illustrative embodiments recognize and take into account that these devices may not provide the desired level of spatial resolution needed to measure the deformed shape of the structure with the desired level of accuracy.

The different illustrative embodiments also recognize that optical systems having cameras require that these cameras be pointed at the structure. Further, operating these optical systems in certain environmental conditions may be more difficult than desired. For example, operating these optical systems in conditions such as, rain, extreme temperatures, wind, snow, nighttime, low light levels, fog, and/or other conditions may be more difficult than desired. Additionally, measuring a three-dimensional shape of a structure using an optical system having cameras may involve using multiple views. Using multiple views may increase the processing resources, effort, and/or time needed to measure the three-dimensional shape of the structure.

The different illustrative embodiments recognize and take into account that a phased array antenna on an aircraft may be deformed during flight of the aircraft. The different illustrative embodiments also recognize and take into account that it may be desirable to have a system configured to identify the deformation of the phased array antenna with the level of accuracy needed to electronically beam steer a phased array antenna to compensate for the deformation of the phased array antenna during flight of the aircraft, within selected tolerances.

Further, the different illustrative embodiments recognize and take into account that it may be desirable to have a system capable of identifying the deformation of the phased array antenna and electronically beam steering the phased array antenna to compensate for this deformation in substantially real-time. In this manner, undesired changes or inconsistencies in the performance of the phased array antenna caused by deformation of the phased array antenna during flight of the aircraft may be reduced and, in some cases, prevented.

Thus, the different illustrative embodiments provide a method and apparatus for managing the performance of a structure. In one illustrative embodiment, a method for identifying deformation of a structure is provided. Training deformation data is identified for each training case in a plurality of training cases. Training strain data is identified for each training case in the plurality of training cases. The training deformation data and the training strain data are configured for use by a heuristic model to increase an accuracy of output data generated by the heuristic model. A group of parameters for the heuristic model is adjusted using the training deformation data and the training strain data for the each training case in the plurality of training cases such that the heuristic model is trained to generate estimated deformation data for the structure based on input strain data. The estimated deformation data has a desired level of accuracy.

The estimated deformation data may be used to adjust a group of control parameters for the structure such that the structure has a desired level of performance during the operation of the platform. In particular, the estimated deformation data may be used to control the structure in a manner that compensates for the deformation of the structure during the operation of the platform.

Referring now to the figures, and in particular, with reference to FIG. 1, an illustration of a training environment is depicted in accordance with an illustrative embodiment. In these illustrative examples, training environment 100 includes trainer 102. Trainer 102 is configured to train heuristic model 104 to identify deformation 106 of structure 108 associated with platform 110.

As used herein, when one component is "associated" with another component, this association is a physical association in these depicted examples. For example, a first component, such as structure 108, may be considered to be associated with a second component, such as platform 110, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, platform 110 may be, for example, without limitation, an aircraft, a helicopter, a jet, an unmanned aerial vehicle (UAV), a space shuttle, an automobile, a rocket, a missile, a watercraft, a propulsion system, a building, a manmade structure, a bridge, a satellite, or some other suitable type of platform. Structure 108 associated with platform 110 may be, for example, without limitation, an imaging system, a communications system, an antenna system, a phased array antenna system, a wing, a skin panel, a cable, a rod, a beam, or some other suitable type of structure.

In one illustrative example, platform 110 is an aircraft, and structure 108 is a phased array antenna system. In this illustrative example, the phased array antenna is associated with the aircraft by being integrated into one or more other structures of the aircraft. For example, the phased array antenna may be integrated into a wing, a stabilizer, a skin panel, or a door of the aircraft.

Deformation 106 of structure 108 is any change in shape 112 of structure 108 from reference shape 114 of structure 108. In one illustrative example, reference shape 114 is the shape of structure 108 without any loads or pressure being applied to structure 108.

When one or more loads and/or pressure is applied to structure 108, structure 108 may deform such that shape 112 of structure 108 changes from reference shape 114 to deformed shape 116. The loads and/or pressure applied to structure 108 may include, for example, without limitation, aerodynamic loads, gusts, vibrations in structure 108, static loads, aero-acoustic loads, temperature-based loads, and/or other suitable types of loads and/or pressures.

Structure 108 may deform during operation of platform 110. When structure 108 has deformed shape 116, structure 108 may operate outside of selected tolerances. An identification of deformed shape 116 for structure 108 may be used to adjust group of control parameters 115 for structure 108.

As used herein, a "group of" items means one or more items. For example, group of control parameters 115 means one or more control parameters 115. Group of control parameters 115 may be adjusted to manage the performance of structure 108 such that structure 108 operates and performs within selected tolerances. In these illustrative examples, "adjusting" a group of parameters, such as group of control parameters 115 may include changing one, some, all, or none of the parameters in the group of parameters.

As one illustrative example, when platform 110 is an aircraft and structure 108 is a phased array antenna system integrated into the aircraft, the phased array antenna system may deform into deformed shape 116, while the aircraft is in flight. When the phased array antenna system has deformed shape 116, the phased array antenna system may operate outside of selected tolerances.

An identification of deformed shape 116 may be used to adjust a phase and/or amplitude of the phased array antenna system to electronically steer a beam formed by the phased array antenna system to compensate for deformation 106, while platform 110 is in flight. When deformation 106 is electronically compensated in this manner, the phased array antenna system operates within selected tolerances during flight. In particular, this system operates within the selected tolerances during flight even when the phased array antenna system has deformed shape 116.

Heuristic model 104 can be trained to identify deformation 106 of structure 108, thereby identifying deformed shape 116 of structure 108. In these illustrative examples, identifying deformation 106 of structure 108 may comprise estimating deformation 106 of structure 108 with a desired level of accuracy. In this manner, deformed shape 116 of structure 108 may be estimated with a desired level of accuracy.

As used herein, a "heuristic model", such as heuristic model 104, may be any mathematical or computational model configured to learn, adapt, make decisions, find patterns in data, remember data, and/or process information in some other suitable manner to generate output data 118 in response to receiving input data 120.

Heuristic model 104 may comprise any number of learning algorithms, decision-making models, problem solving-models, computational algorithms, and/or other types of processes. In these illustrative examples, heuristic model 104 comprises at least one of a neural network, a learning-based algorithm, a regression model, a support vector machine, a data fitting model, a pattern recognition model, artificial intelligence (AI), and some other suitable type of algorithm or model.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As depicted in these examples, heuristic model 104 is configured to generate output data 118 in response to receiving input data 120 based on group of parameters 121. Group of parameters 121 may include, for example, without limitation, biases, weights, coefficients, relationships, constants, constraints, and/or other suitable types of parameters. In one illustrative example, heuristic model 104 may include an equation comprising biases and weights configured to produce output data 118 in response to receiving input data 120.

In these illustrative examples, trainer 102 is configured to train heuristic model 104 to estimate deformation 106 of structure 108 with a desired level of accuracy. Estimating deformation 106 of structure 108 with a desired level of accuracy means estimating deformation 106 such that a difference between the estimated deformation of structure 108 and the actual deformation of structure 108 is within selected tolerances.

Trainer 102 may be implemented using hardware, software, or a combination of both in these examples. For example, trainer 102 may be implemented in computer system 122. Computer system 122 comprises a number of computers. As used herein, a "number of" items means one or more items. For example, a number of computers means one or more computers.

When more than one computer is present in computer system 122, these computers are in communication with each other. The different computers in computer system 122 may be located on platform 110, on structure 108, and/or remote to platform 110.

In one illustrative example, heuristic model 104 generates output data 118 in the form of estimated deformation data 124 in response to receiving input data 120 in the form of input strain data 126. Estimated deformation data 124 defines the estimated deformed shape for structure 108 based on input strain data 126.

As used herein, "deformation data", such as estimated deformation data 124, comprises a plurality of estimated deformation measurements. A "plurality of" items, as used herein, means two or more items. For example, a plurality of estimated deformation measurements means two or more estimated deformation measurements.

In these depicted examples, a deformation measurement is a measurement of the deflection of a point on structure 108 from the location of the point when structure 108 has reference shape 114, to the location of the point when structure 108 has deformed shape 116. As used herein, the "deflection" of a point on structure 108 is the distance between the point when the structure 108 has reference shape 114 and the point when the structure 108 has deformed shape 116. This deflection of the point may be also referred to as a displacement of the point.

In these illustrative examples, the measurement of the deflection of the point may be in units of length. Units of length include, for example, without limitation, inches, feet, centimeters, millimeters, and other types of units of length. Of course, in other illustrative examples, the measurement of the deflection of the point may be in angular units. Angular units include, for example, without limitation, radians, degrees, and other types of angular units.

Further, as used herein, "strain data", such as input strain data 126, comprises a plurality of strain measurements. A strain measurement is a measurement of the deflection of a point on structure 108 from the location of the point when structure 108 has reference shape 114 to the location of the point when structure 108 has deformed shape 116, normalized relative to a reference length. A strain measurement does not have any units and may be represented as a percentage, a fraction, or a parts-per-notation (ppn).

Heuristic model 104 may receive input strain data 126 in a number of different ways. As one illustrative example, input strain data 126 may be received as strain data 128 generated by sensor system 130. Sensor system 130 is associated with structure 108. In some illustrative examples, a portion of sensor system 130 may be associated with platform 110.

Sensor system 130 comprises plurality of sensors 132 configured to generate strain data 128. Strain data 128 comprises a plurality of strain measurements generated by plurality of sensors 132, respectively. A sensor in plurality of sensors 132 may comprise at least one of, for example, a strain gauge, a fiber-optic sensor, a piezoelectric sensor, a transducer, or some other suitable type of sensor configured to generate strain measurements.

In some illustrative examples, input data 120 may also include additional input data 133 in addition to input strain data 126. Additional input data 133 may include any data that may affect output data 118 generated by heuristic model 104 based on input strain data 126. In particular, additional input data 133 may include any data about conditions that may affect deformation 106 of structure 108 while platform 110 operates.

For example, additional input data 133 may include environmental data such as, for example, measurements of environmental conditions that may affect deformation 106 of structure 108 and/or strain data 128. This environmental data may include, for example, temperature data, humidity data, and/or other suitable types of data. In some cases, additional input data 133 may include data from an inertial measurement unit (IMU) attached to platform 110, position data, altitude data, velocity data, acceleration data, and/or other suitable types of data.

In these illustrative examples, trainer 102 trains heuristic model 104 using plurality of training cases 136 selected for training heuristic model 104. As used herein, a "training case", such as a training case in plurality of training cases 136 is a particular state for structure 108 in which data about structure 108, when structure 108 is in this particular state, is used to train heuristic model 104. The particular state for structure 108 may be, for example, a particular deformed shape for structure 108. However, in some cases, the particular state for structure 108 may be a selected amount of loading and/or pressure being applied to structure 108.

Trainer 102 identifies training deformation data and training strain data for each training case in plurality of training cases 136. Training case 140 is an example of one of plurality of training cases 136. Further, trainer 102 identifies training deformation data 142 and training strain data 144 for training case 140.

Trainer 102 sends training deformation data 142 and training strain data 144 to heuristic model 104. Heuristic model 104 uses training deformation data 142 and training strain data 144 to adjust group of parameters 121 for heuristic model 104. Group of parameters 121 are adjusted such that heuristic model 104 is capable of generating estimated deformation data 124 for structure 108 with a desired level of accuracy based on input strain data 126. In these illustrative examples, trainer 102 trains heuristic model 104 using plurality of training cases 136 and an iterative process.

The training deformation data and training strain data identified for each training case in plurality of training cases 136 may be identified in a number of different ways in training environment 100. For example, training environment 100 may be a laboratory, a testing facility, a wind tunnel, or some other type of training environment in which the training deformation data and the training strain data can be generated. In some cases, training environment 100 may be the actual environment in which platform 110 operates. In this manner, the training deformation data and the training strain data may be gathered and collected in any number of different ways.

In one illustrative example, plurality of actuators 146 are used to deform structure 108 according to plurality of training cases 136. For example, plurality of actuators 146 may be used to cause structure 108 to deform in a manner corresponding to training case 140. More specifically, plurality of actuators 146 may be used to apply a plurality of selected loads to plurality of points 148 on structure 108 to cause plurality of points 148 to deflect in a manner that causes structure 108 to have the deformed shape corresponding to training case 140.

Of course, in other illustrative examples, some other type of system may be used to cause structure 108 to deform in a manner corresponding to plurality of training cases 136. Depending on the implementation, structure 108 may be deformed for the purposes of training with structure 108 separated from platform 110. In some illustrative examples, platform 110 may be operated with structure 108 associated with platform 110 to cause structure 108 to deform according to plurality of training cases 136.

When structure 108 has been deformed according to a particular training case, training deformation data and training strain data for that training case are identified. The training deformation data and the training strain data may be referred to as a training data set, in some illustrative examples. The training deformation data may be identified in a number of different ways. As one illustrative example, trainer 102 may identify the training deformation data using imaging data 150 received from imaging system 152.

Imaging system 152 comprises any number of components configured to generate imaging data 150 from which a plurality of deformation measurements can be identified. For example, imaging system 152 may comprise an optical imaging system, a laser imaging system, an infrared imaging system, or some other suitable type of imaging system. In some illustrative examples, imaging data 150 may include a plurality of deformation measurements for use as the training deformation data.

Further, strain data 128 generated by sensor system 130 when structure 108 is deformed according to a particular training case may be used as the training strain data for that training case. Of course, in other illustrative examples, sensor system 130 may generate other sensor data in addition to and/or in place of strain data 128. Trainer 102 may use this other sensor data to identify the training strain data.

In these illustrative examples, the number of training cases in plurality of training cases 136 may be selected by the operator. New training cases may be added to plurality of training cases 136 at any point in time such that heuristic model 104 can adapt to this new data.

Further, in some cases, trainer 102 may identify training environmental data for a training case, such as training case 140, to train heuristic model 104. This training environmental data may be identified in a number of different ways. For example, historical environmental data and/or test environmental data may be used. This training environmental data may be used to train heuristic model 104 such that estimated deformation data 124 may be generated with the desired level of accuracy based on input strain data 126 when structure 108 is operated in different types of environmental conditions.

Once heuristic model 104 has been trained within training environment 100, heuristic model 104 can be used in structure 108 to manage the performance of structure 108 during operation of platform 110. For example, when structure 108 is a phased array antenna, heuristic model 104 may be used in a processor unit associated with the phased array antenna. Estimated deformation data 124 generated by heuristic model 104 during operation of platform 110 may be used to adjust group of control parameters 115 for structure 108.

In these illustrative examples, group of control parameters 115 are adjusted to increase the performance of structure 108 to a desired level of performance when structure 108 has deformed shape 116. The performance of structure 108 may be evaluated using group of performance parameters 154 for structure 108. When structure 108 is a phased array antenna, group of performance parameters 154 may include, for example, without limitation, peak sidelobe ratio (PSLR), gain loss, beam steering angle deviation, and/or other types of suitable performance parameters.

Estimated deformation data 124 may be used to calculate values for adjusting group of control parameters 115. Group of control parameters 115 may be adjusted based on these values until group of performance parameters 154 indicates that structure 108 has the desired level of performance when structure 108 has deformed shape 116. In this manner, estimated deformation data 124 is used to adjust group of control parameters 115 to compensate for deformation 106 of structure 108 such that structure 108 maintains a desired level of performance.

In these illustrative examples, estimated deformation data 124 may be identified for structure 108 and used to adjust group of control parameters 115 for structure 108 during operation of platform 110 in substantially real-time. These processes being performed in "substantially real-time" means that these processes are performed without any unintentional delays. In some cases, in "substantially real-time" may mean immediately.

For example, without limitation, in response to structure 108 deforming from reference shape 114, heuristic model 104 is used to generate estimated deformation 124 for this deformation immediately. Estimated deformation data 124 may then be used to immediately control structure 108 by adjusting group of control parameters 115 to compensate for this deformation. In this manner, any change in a level of performance of structure 108 in response to the deformation of structure 108 may be reduced, and in some cases, prevented.

In this manner, the different illustrative embodiments provide a method and apparatus for identifying deformation 106 of structure 108 and managing the performance of structure 108 based on this estimation. Further, the different illustrative embodiments provide a method and apparatus for training heuristic model 104 to generate estimated deformation data 124 for structure 108 with a desired level of accuracy in response to receiving input data 120.

The illustration of training environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, heuristic model 104 may comprise a plurality of neural networks. Each neural network may be configured to generate estimated deformation data 124 for a particular point on structure 108. In these cases, each neural network may be trained to generate an estimated deformation measurement for the particular point on structure 108 based on one or more input strain measurements at or near the particular point on structure 108.

Further, each training case for each neural network may comprise one or more training strain measurements and one training deformation measurement at the particular point. The training deformation measurement may be identified using a sensor at the particular point on structure 108.

Figure 2:
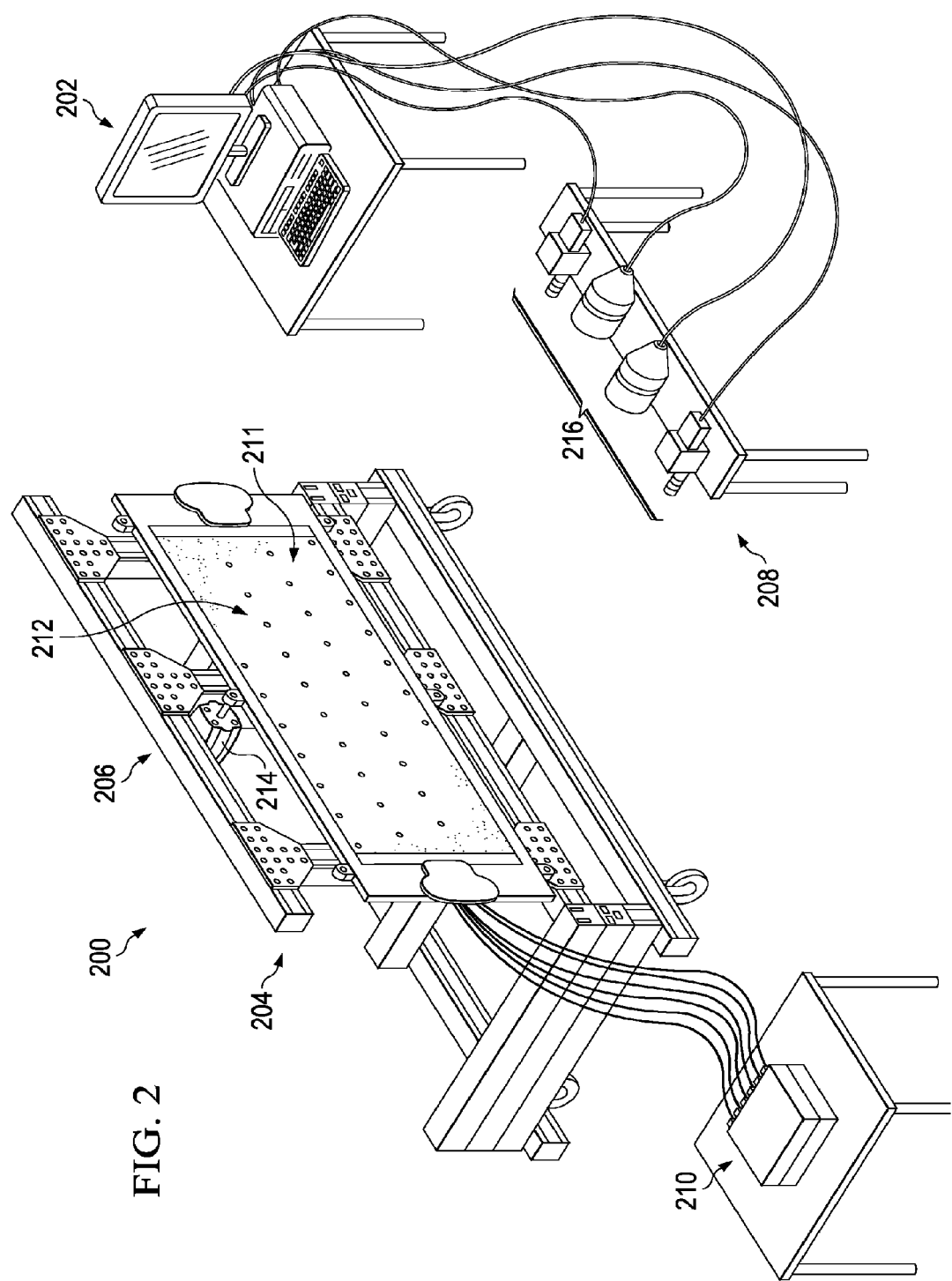
FIG. 2 is an illustration of a training environment in accordance with an illustrative embodiment.

With reference now to FIG. 2, an illustration of a training environment is depicted in accordance with an illustrative embodiment. In this illustrative embodiment, training environment 200 is an example of one implementation for training environment 100 in FIG. 1. As depicted, computer system 202, support system 204, actuator system 206, imaging system 208, and sensor system 210 are present in training environment 200.

Computer system 202 may be an example of one implementation for computer system 122 in FIG. 1. A heuristic model, such as heuristic model 104 in FIG. 1, may be trained using computer system 202. In particular, the heuristic model may be trained using a trainer, such as, for example, trainer 102 in FIG. 1, implements in computer system 202.

As depicted, support system 204 is configured to hold and support structure 211. In this illustrative example, structure 211 is phased array antenna 212. Support system 204 supports and holds phased array antenna 212, while actuator system 206 applies a plurality of loads to phased array antenna 212 for selected training cases. As depicted, actuator system 206 comprises plurality of actuators 214 positioned relative to a plurality of points on phased array antenna 212. Plurality of actuators 214 is configured to apply a plurality of selected loads to the plurality of points on phased array antenna 212 to cause phased array antenna 212 to deform in a manner corresponding to a particular training case. In these illustrative examples, applying a selected load to a point on phased array antenna 212 causes that point to be deflected from a reference position of that point by a selected amount.

Imaging system 208 is used to generate imaging data of phased array antenna 212. In this illustrative example, imaging system 208 comprises plurality of cameras 216. The imaging data generated by plurality of cameras 216 may be used to identify a plurality of deformation measurements at the plurality of points on phased array antenna 212. In this illustrative example, each deformation measurement may be a deflection of a corresponding point on phased array antenna 212 in a direction substantially perpendicular to phased array antenna 212.

For example, a trainer, such as trainer 102 in FIG. 1, may identify deformation measurements for phased array antenna 212 using the imaging data generated by plurality of cameras 216. These deformation measurements provide an indication of the deformed shape of phased array antenna 212.

Further, sensor system 210 generates a plurality of strain measurements for phased array antenna 212. Sensor system 210 comprises a plurality of strain gauges (not shown in this view) embedded into phased array antenna 212. The plurality of strain measurements generated by sensor system 210 and the plurality of deformation measurements identified using imaging system 208 are sent to computer system 202 for processing. A trainer, such as trainer 102 in FIG. 1, uses these different deformation measurements and strain measurements to train a heuristic model to estimate the deformation of phased array antenna 212 with a desired level of accuracy based on strain data input into the heuristic model. The trainer may also use other information such as, for example, environmental data, to train the heuristic model.

The illustration of training environment 200 in FIG. 2 is not meant to imply physical or architectural limitations to the manner in which an illustrative embodiment may be implemented. Other components in addition to or in place of the ones illustrated may be used. Some components may be optional.

Further, the different components shown in FIG. 2 may be combined with components in FIG. 1, used with components in FIG. 1, or a combination of the two. Additionally, some of the components in FIG. 2 may be illustrative examples of how components shown in block form in FIG. 1 can be implemented as physical structures.

Figures 3, 4:
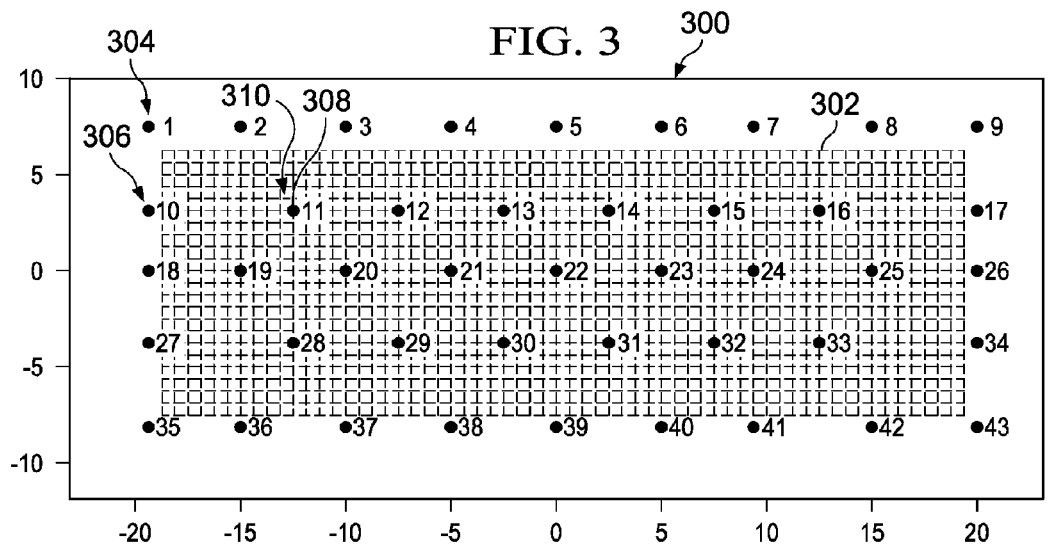
FIG. 3 is an illustration of a plurality of sensors associated with a phased array antenna in accordance with an illustrative embodiment.
FIG. 4 is an illustration of a table of estimated deformation data in accordance with an illustrative embodiment.

With reference now to FIG. 3, an illustration of a plurality of sensors associated with a phased array antenna is depicted in accordance with an illustrative embodiment. In this illustrative example, phased array antenna 300 is an example of one implementation for phased array antenna 212 in FIG. 2. Further, phased array antenna 300 is an example of one implementation for structure 108 in FIG. 1.

Phased array antenna 300 has an array of antenna elements located within portion 302 of phased array antenna 300. Plurality of sensors 304 are positioned at plurality of points 306 on phased array antenna 300 in this depicted example. As depicted, a portion of plurality of sensors 304 are located within portion 302 of phased array antenna 300 and another portion of plurality of sensors 304 are located outside of portion 302 of phased array antenna 300.

Plurality of sensors 304 may take the form of, for example, without limitation, a plurality of strain gauges. Each strain gauge is configured to generate a strain measurement at the point on phased array antenna 300 at which the strain gauge is located. For example, sensor 308 at point 310 within portion 302 of phased array antenna 300 is configured to generate a strain measurement at point 310.

In this manner, plurality of sensors 304 generates a plurality of strain measurements that form strain data for use as input strain data for a heuristic model, such as heuristic model 104 in FIG. 1. In particular, the strain measurements generated by plurality of sensors 304 are an example of strain data 128 in FIG. 1 that may be used as input strain data 126 for heuristic model 104 in FIG. 1. Further, the strain measurements generated by plurality of sensors 304 may be used to train heuristic model 104 in FIG. 1.

With reference now to FIG. 4, an illustration of a table of estimated deformation data is depicted in accordance with an illustrative embodiment. In this illustrative example, table 400 includes point identifiers 402, training case 404, training case 406, training case 408, training case 410, and training case 412.

Point identifiers 402 identify the points on a structure for which estimated deformation measurements 413 are generated by a heuristic model, such as heuristic model 104 in FIG. 1, that has been trained by, for example, trainer 102 in FIG. 1. In this illustrative example, the points identified by point identifiers 402 are a selected combination of points from plurality of points 306 on phased array antenna 300 in FIG. 3.

Training case 404, training case 406, training case 408, training case 410, and training case 412 each correspond to a particular deformed shape for phased array antenna 300. For each of these training cases, the sensors in plurality of sensors 304 in FIG. 3 positioned at the points identified in point identifiers 402 generate strain measurements for these points when phased array antenna 300 is deformed into a deformed shape corresponding to the training case. These strain measurements are input into the heuristic model to generate estimated deformation measurements 413 for these same points.

With reference now to FIG. 5, an illustration of a table of actual deformation data is depicted in accordance with an illustrative embodiment. In this illustrative example, table 500 includes point identifiers 502, training case 504, training case 506, training case 508, training case 510, and training case 512.

Point identifiers 502 identify the points on a structure for which actual deformation measurements 513 are identified. Actual deformation measurements 513 are the deformation measurements identified for the points on the structure when the structure has actually been deformed. Actual deformation measurements 513 for these training cases may be identified using, for example, imaging data 150 generated by imaging system 152 in FIG. 1.

In this illustrative example, the points identified in point identifiers 502 are a selected combination of points from plurality of points 306 on phased array antenna 300 in FIG. 3. In particular, the points identified by point identifiers 502 are the same points identified by point identifiers 402 in FIG. 4.

Training case 504, training case 506, training case 508, training case 510, and training case 512 are the same as training case 404, training case 406, training case 408, training case 410, and training case 412, respectively.

Turning now to FIG. 6, an illustration of a table of differences between estimated deformation measurements and actual deformation measurements is depicted in accordance with an illustrative embodiment. In this illustrative example, table 600 includes point identifiers 602. In this illustrative example, point identifiers 602 identifies the same points identified by point identifiers 502 in FIG. 5 and point identifiers 402 in FIG. 4.

Table 600 presents difference values 604 for training case 606, training case 608, training case 610, training case 612, and training case 614. Training case 606, training case 608, training case 610, training case 612, and training case 614 are the same as training case 404, training case 406, training case 408, training case 410, and training case 412, respectively, in FIG. 4. Further, training case 606, training case 608, training case 610, training case 612, and training case 614 are the same as training case 504, training case 506, training case 508, training case 510, and training case 512, respectively, in FIG. 5.

Difference values 604 are the differences between estimated deformation measurements 413 in FIG. 4 and actual deformation measurements 513 in FIG. 5. In this illustrative example, difference values 604 indicate that estimated deformation measurements 413 have the desired level of accuracy.

Figure 7:
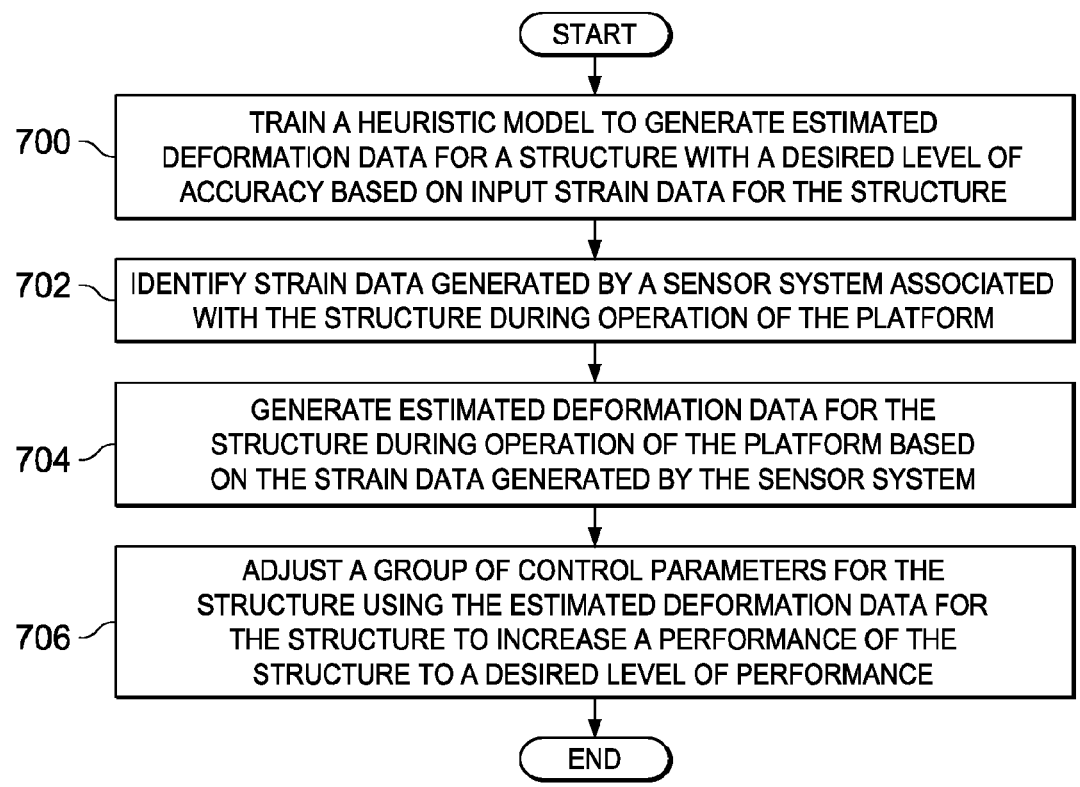
FIG. 7 is an illustration of a flowchart of a process for managing the performance of a structure in the form of a flowchart in accordance with an illustrative embodiment.

With reference now to FIG. 7, an illustration of a process for managing the performance of a structure in the form of a flowchart is depicted in accordance with an illustrative embodiment. The process illustrated in FIG. 7 may be implemented using trainer 102, heuristic model 104, and structure 108 in FIG. 1.

The process begins by training a heuristic model to generate estimated deformation data for a structure with a desired level of accuracy based on input strain data for the structure (operation 700). The structure may be, for example, structure 108 in FIG. 1. The structure may be configured for association with a platform, such as platform 110 in FIG. 1. The structure may or may not be associated with the platform when the training data needed to train the heuristic model is collected.

Thereafter, the process identifies strain data generated by a sensor system associated with the structure during operation of the platform (operation 702). In operation 702, the structure is associated with the platform and may experience loading and/or pressure applied to the structure during operation of the platform. Further, in this illustrative example, the sensor system comprises a plurality of strain gauges attached to and/or embedded within the structure.

The process then generates estimated deformation data for the structure during operation of the platform based on the strain data generated by the sensor system (operation 704). The strain data generated by the sensor system forms the input strain data for the heuristic model.

The process then adjusts a group of control parameters for the structure using the estimated deformation data for the structure to increase a performance of the structure to a desired level of performance (operation 706), with the process terminating thereafter. As one illustrative example, when the structure is a phased array antenna, the estimated deformation data is used to adjust a phase and/or an amplitude for electronically steering a beam formed by the phased array antenna. For example, the estimated deformation data may be input into a compensation algorithm for the phased array antenna.

Figure 8:
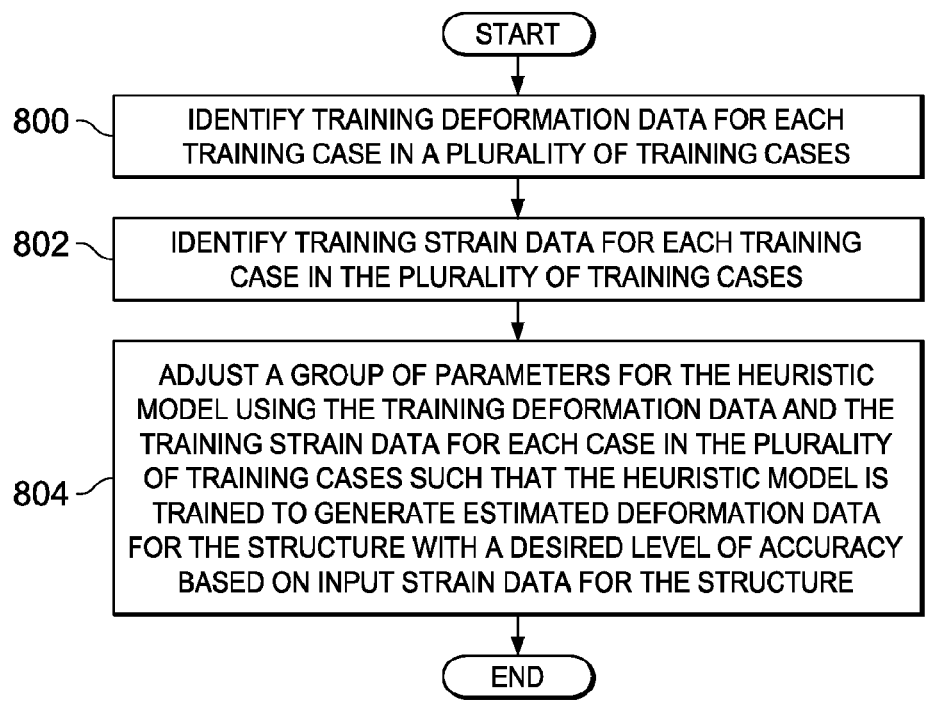
FIG. 8 is an illustration of a flowchart of a process for training a heuristic model in the form of a flowchart in accordance with an illustrative embodiment.

With reference now to FIG. 8, an illustration of a process for training a heuristic model in the form of a flowchart is depicted in accordance with an illustrative embodiment. The process illustrated in FIG. 8 may be used to implement operation 700 in FIG. 7. Further, this process may be implemented using trainer 102 in FIG. 1.

The process begins by identifying training deformation data for each training case in a plurality of training cases (operation 800). Each training case in the plurality of training cases corresponds to at least one of a particular deformed shape for a structure, such as structure 108 in FIG. 1, and a selected amount of loading and/or pressure to be applied to the structure. In operation 800, the training deformation data may be identified using, for example, imaging data 150 generated by imaging system 152 in FIG. 1.

The process then identifies training strain data for each training case in the plurality of training cases (operation 802).

In operation 802, the training strain data may be identified using, for example, strain data generated by a sensor system associated with the structure, such as, for example, strain data 128 generated by sensor system 130 associated with structure 108 in FIG. 1.

Thereafter, the process adjusts a group of parameters for the heuristic model using the training deformation data and the training strain data for each case in the plurality of training cases such that the heuristic model is trained to generate estimated deformation data for the structure with a desired level of accuracy based on input strain data for the structure (operation 804), with the process terminating thereafter. In particular, operation 804 may be performed such that the heuristic model generates estimated deformation data for the structure with the desired level of accuracy during the operation of the platform with which the structure is associated.

Figure 9:
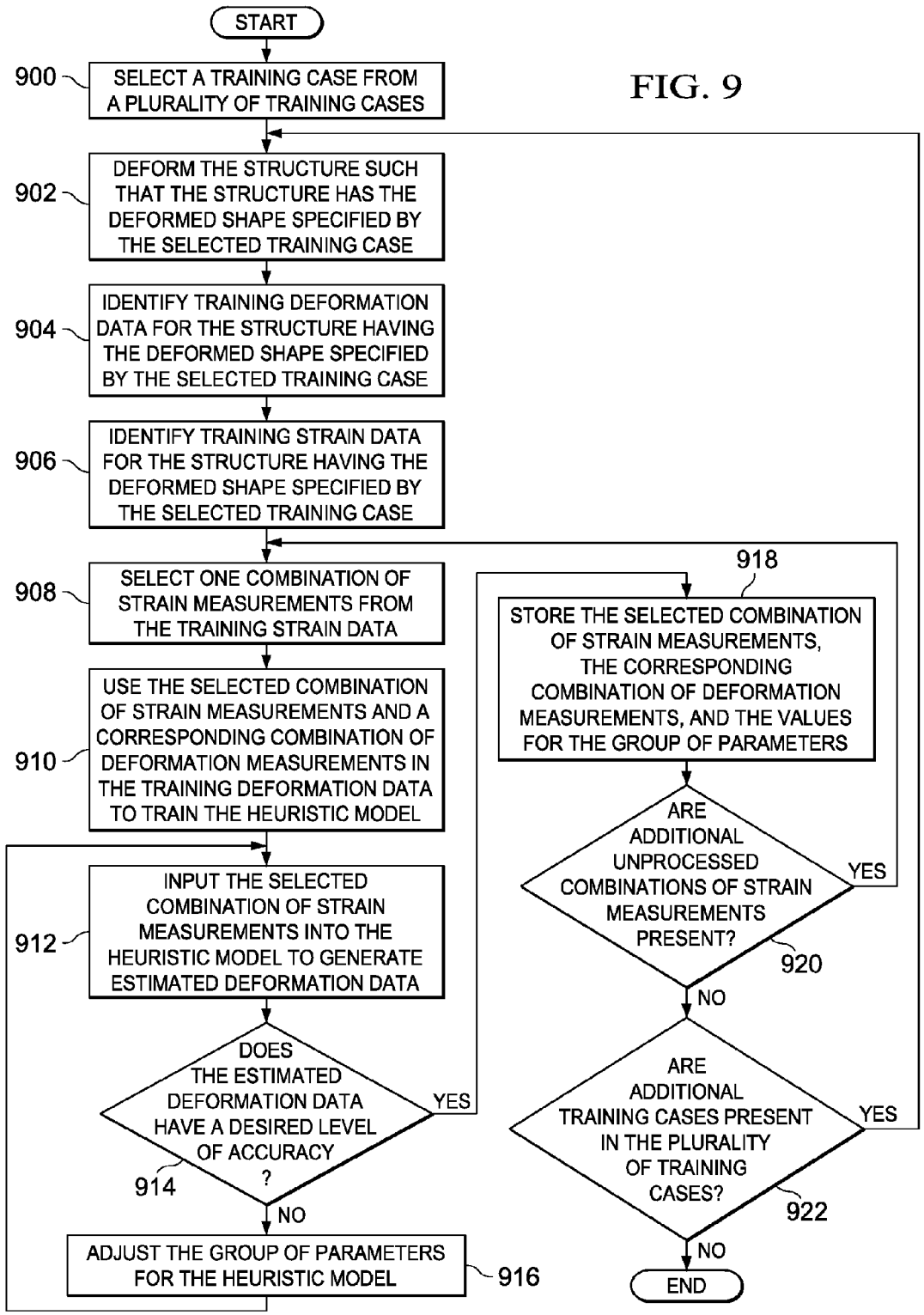
FIG. 9 is an illustration of a flowchart of a process for training a heuristic model in the form of a flowchart in accordance with an illustrative embodiment.

With reference now to FIG. 9, an illustration of a process for training a heuristic model in the form of a flowchart is depicted in accordance with an illustrative embodiment. The process illustrated in FIG. 9 may be used to implement operation 700 in FIG. 7. Further, this process may be a more detailed process of the process described in FIG. 8.

The process begins by selecting a training case from a plurality of training cases (operation 900). In this illustrative example, each training case in the plurality of training cases specifies a particular deformed shape for the structure. The process then deforms the structure such that the structure has the deformed shape specified by the selected training case (operation 902).

Thereafter, the process identifies training deformation data for the structure having the deformed shape specified by the selected training case (operation 904). Operation 904 may be performed using, for example, an imaging system. The training deformation data identified in operation 904 comprises a plurality of deformation measurements identified for a plurality of points on the structure.

The process also identifies training strain data for the structure having the deformed shape specified by the selected training case (operation 906). Operation 906 may be performed using a sensor system associated with the structure. The sensor system comprises a plurality of sensors. Each sensor generates a strain measurement for a particular point on the structure at which the sensor is positioned. In this manner, training strain data comprises a plurality of strain measurements for a plurality of points on the structure.

In this illustrative example, the plurality of deformation measurements in the training deformation data and the plurality of strain measurements in the training strain data are generated for a same plurality of points on the structure. In this manner, each strain measurement generated at a point on the structure corresponds to a deformation measurement generated at the same point on the structure.

Next, the process selects one combination of strain measurements from the training strain data (operation 908). As used herein, a "combination of strain measurements" is a selection of one or more of the plurality of strain measurements generated by the plurality of sensors in the sensor system. The combination of strain measurements does not include more than one strain measurement from a particular sensor in the sensor system. In this manner, a selection of a combination of strain measurements corresponds to a selection of a combination of sensors in the sensor system. The combination of strain measurements selected may include one, some, or all of the strain measurements.

The process then uses the selected combination of strain measurements and a corresponding combination of deformation measurements in the training deformation data to train the heuristic model (operation 910). In operation 910, the heuristic model uses the selected combination of strain measurements and the corresponding combination of deformation measurements to adjust a group of parameters for the heuristic model. The group of parameters adjusted determines the estimated deformation data that is generated by the heuristic model based on certain input strain data.

Thereafter, the process inputs the selected combination of strain measurements into the heuristic model to generate estimated deformation data (operation 912). The process determines whether the estimated deformation data has a desired level of accuracy (operation 914). In operation 914, the determination may be made based on whether a difference between the estimated deformation data generated by the heuristic model and the actual deformation data indicated in the training deformation data is within selected tolerances.

If the estimated deformation data does not have the desired level of accuracy, the process adjusts the group of parameters for the heuristic model (916) and then returns to operation 912. With reference again to operation 914, if the estimated deformation data has the desired level of accuracy, the process stores the selected combination of strain measurements, the corresponding combination of deformation measurements, and the values for the group of parameters (operation 918).

The process then determines whether any additional unprocessed combinations of strain measurements are present (operation 920). If any additional unprocessed combinations of strain measurements are present, the process returns to operation 908 as described above to select a new unprocessed combination of strain measurements.

Otherwise, the process determines whether any additional training cases are present in the plurality of training cases (operation 922). If any additional unprocessed training cases are present, the process returns to operation 900 as described above. Otherwise, the process terminates. In this manner, the process described in FIG. 1 trains the heuristic model to generate estimated deformation data for the structure with a desired level of accuracy using the plurality of training cases.

Figure 10:
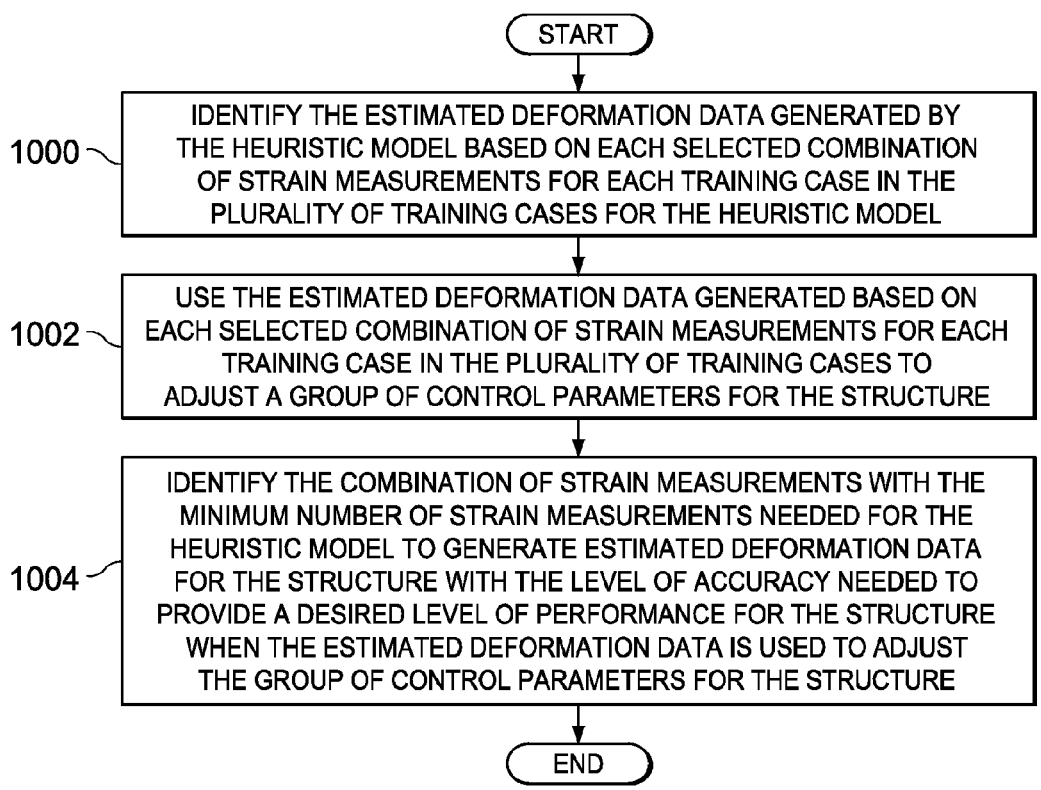
FIG. 10 is an illustration of a flowchart of a process for identifying a configuration of sensors for use on a structure in the form of a flowchart in accordance with an illustrative embodiment.

With reference now to FIG. 10, an illustration of a process for identifying a configuration of sensors for use on a structure in the form of a flowchart is depicted in accordance with an illustrative embodiment. The process described in FIG. 10 may be implemented to select a number of sensors from plurality of sensors 132 in sensor system 130 for structure 108 in FIG. 1 and a configuration for these selected sensors.

The process begins by identifying the estimated deformation data generated by the heuristic model based on each selected combination of strain measurements for each training case in the plurality of training cases for the heuristic model (operation 1000). The process then uses the estimated deformation data generated based on each selected combination of strain measurements for each training case in the plurality of training cases to adjust a group of control parameters for the structure (operation 1002).

Thereafter, the process identifies the combination of strain measurements with the minimum number of strain measurements needed for the heuristic model to generate estimated deformation data for the structure with the level of accuracy needed to provide a desired level of performance for the structure when the estimated deformation data is used to adjust the group of control parameters for the structure (operation 1004), with the process terminating thereafter. For example, a compensation algorithm may use the estimated deformation data generated by the heuristic model to adjust the group of control parameters for the structure such that the structure has a desired level of performance.

The estimated deformation data has the desired level of accuracy when a difference between a group of performance parameters for the structure based on adjustments to the group of control parameters, identified using the estimated deformation data, and the group of performance parameters for the structure based on adjustments to the group of control parameters, identified using actual deformation data, are within selected tolerances. In operation 1004, the process determines which combination of strain measurements, that leads to the heuristic model generating estimated deformation data with the desired level of accuracy, has the minimum number of sensors.

The flowcharts and block diagrams in the different depicted embodiments illustrate the architecture, functionality, and operation of some possible implementations of apparatuses and methods according to an illustrative embodiment. In this regard, each block in the flowcharts or block diagrams may represent a module, segment, function, and/or a portion of an operation or step. For example, one or more of the blocks may be implemented as program code, in hardware, or as a combination of the two. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

With reference now to FIGS. 11-14, illustrations of comparisons between graphs for control parameters are depicted in accordance with an illustrative embodiment. In FIGS. 11-14, each pair of graphs compares adjustments made to a control parameter for a phased array antenna using estimated deformation data and actual deformation data.

The estimated deformation data may be generated using, for example, heuristic model 104 in FIG. 1. The estimated deformation data is generated by the heuristic model using strain data generated by a sensor system associated with the phased array antenna. In FIGS. 11-14, the values of the control parameters are presented in the different graphs with respect to the number of sensors in the sensor system associated with the phased array antenna.

Figure 11:
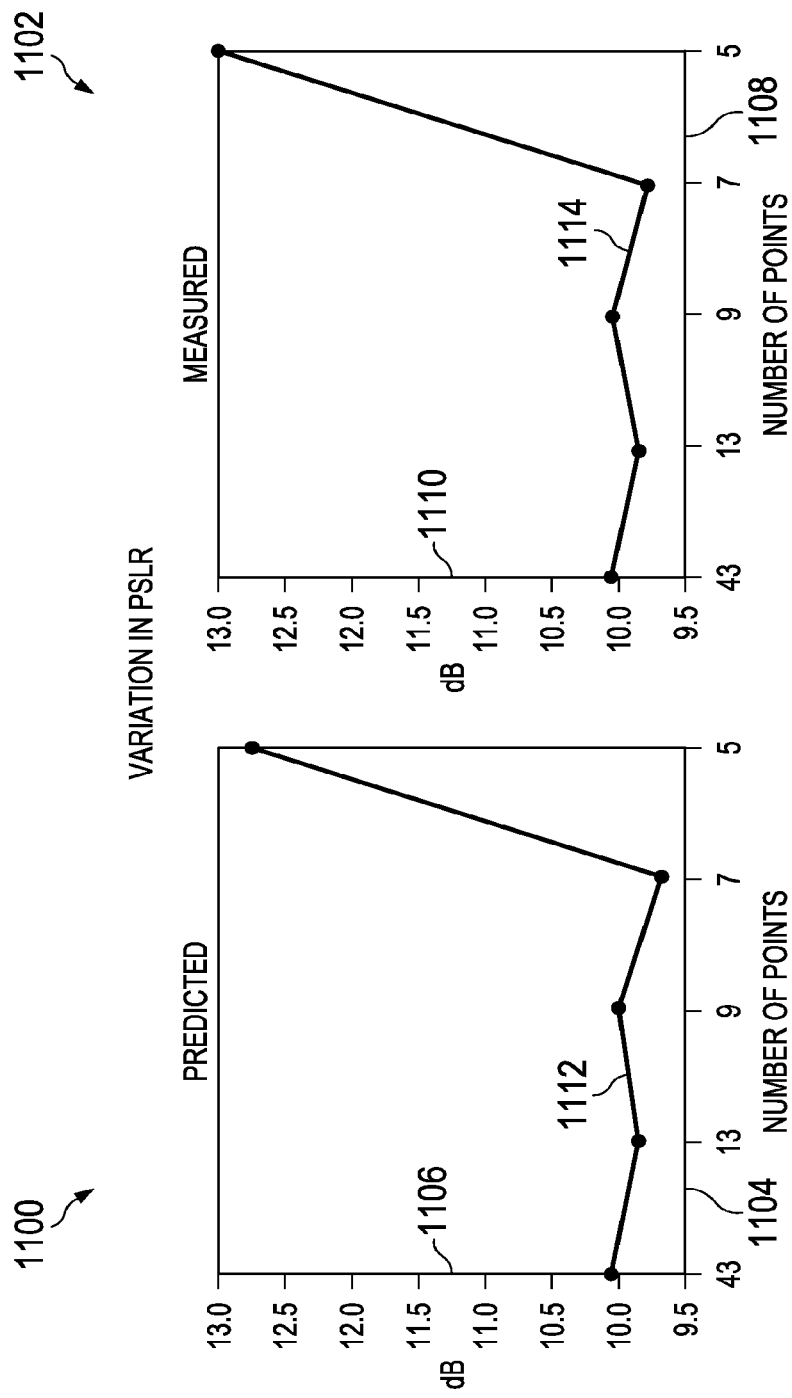
FIG. 11 is an illustration of a comparison of graphs for the peak sidelobe ratio of a phased array antenna in accordance with an illustrative embodiment.

With reference now to FIG. 11, an illustration of a comparison of graphs for the peak sidelobe ratio of a phased array antenna is depicted in accordance with an illustrative embodiment. Graph 1100 has horizontal axis 1104 and vertical axis 1106. Graph 1102 has horizontal axis 1108 and vertical axis 1110.

Both horizontal axis 1104 and horizontal axis 1108 represent a number of points on the phased array antenna for which estimated deformation measurements and actual deformation measurements are identified. Both vertical axis 1106 and vertical axis 1110 represent the peak sidelobe ratio, in decibels, selected for the phased array antenna.

However, curve 1112 in graph 1100 identifies the peak sidelobe ratio when estimated deformation data generated by a trained heuristic model is used to adjust the phase and/or amplitude for the phased array antenna. Curve 1114 in graph 1102 identifies the peak sidelobe ratio when actual deformation data is used to adjust the phase and/or amplitude for the phased array antenna.

As depicted, these curves indicate that the peak sidelobe ratio selected for the phased array antenna based on the estimated deformation data is within selected tolerances of the peak sidelobe ratio selected for the phased array antenna based on the actual deformation data. In other words, the peak sidelobe ratio for the phased array antenna, when the phased array antenna is electronically compensated using the estimated deformation data, and the peak sidelobe ratio for the phased array antenna when the phased array antenna is electronically compensated using the actual deformation data may be substantially equal within selected tolerances.

Figure 12:
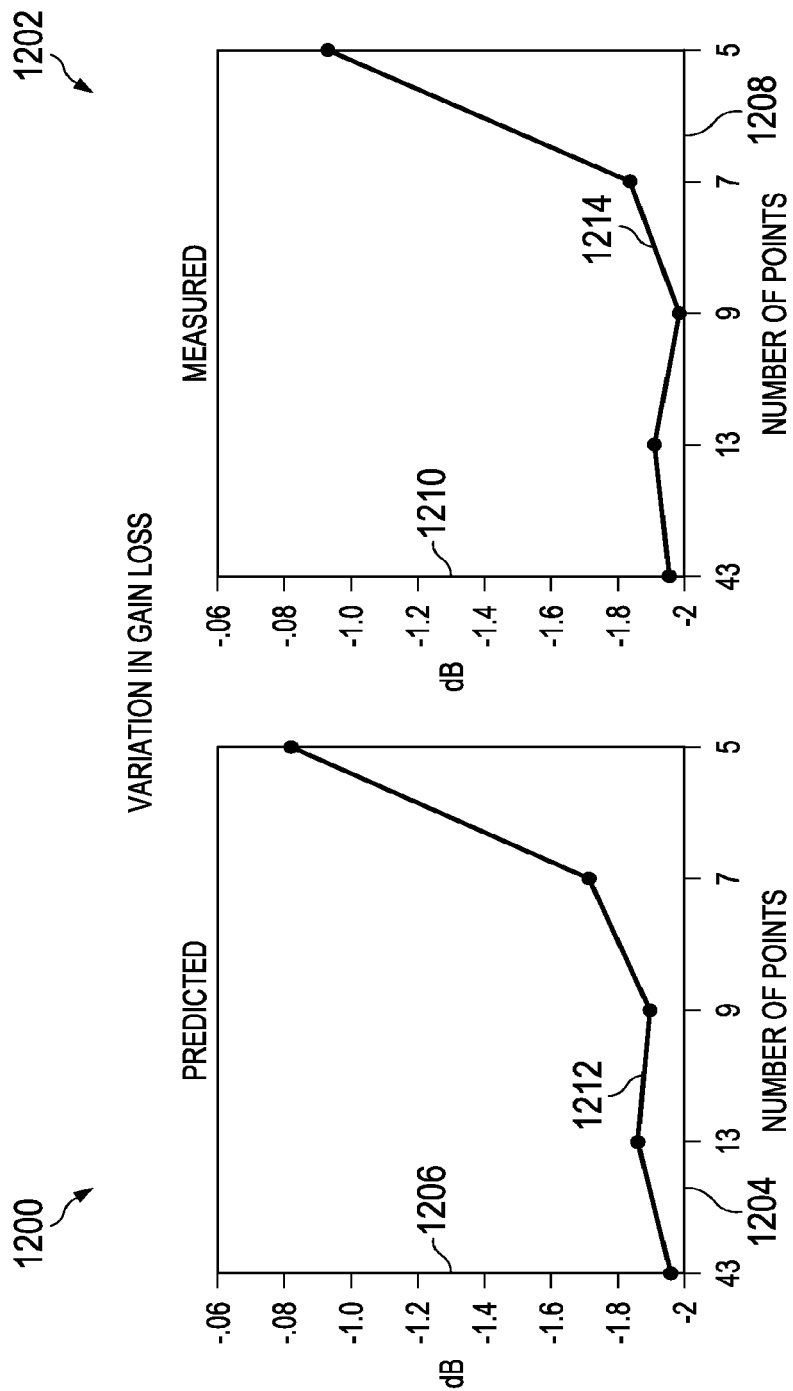
FIG. 12 is an illustration of a comparison of graphs for a reduction in gain in accordance with an illustrative embodiment.

With reference now to FIG. 12, an illustration of a comparison of graphs for a reduction in gain is depicted in accordance with an illustrative embodiment. In this illustrative example, graph 1200 has horizontal axis 1204 and vertical axis 1206. Graph 1202 has horizontal axis 1208 and vertical axis 1210.

Both horizontal axis 1204 and horizontal axis 1208 represent a number of sensors in the sensor system associated with the phased array antenna. Both vertical axis 1206 and vertical axis 1210 represent the reduction in gain for the phased array antenna, in decibels.

However, curve 1212 in graph 1200 identifies the reduction in gain when estimated deformation data generated by a trained heuristic model is used to adjust the phase and/or amplitude for the phased array antenna. Curve 1214 in graph 1202 identifies the reduction in gain when actual deformation data is used to adjust the phase and/or amplitude for the phased array antenna.

As depicted, these curves indicate that the reduction in gain for the phased array antenna based on the estimated deformation data is within selected tolerances of the reduction in gain for the phased array antenna based on the actual deformation data. In other words, the reduction in gain for the phased array antenna when the phased array antenna is electronically compensated using the estimated deformation data and the reduction in gain for the phased array antenna when the phased array antenna is electronically compensated using the actual deformation data may be substantially equal within selected tolerances.

Figure 13:
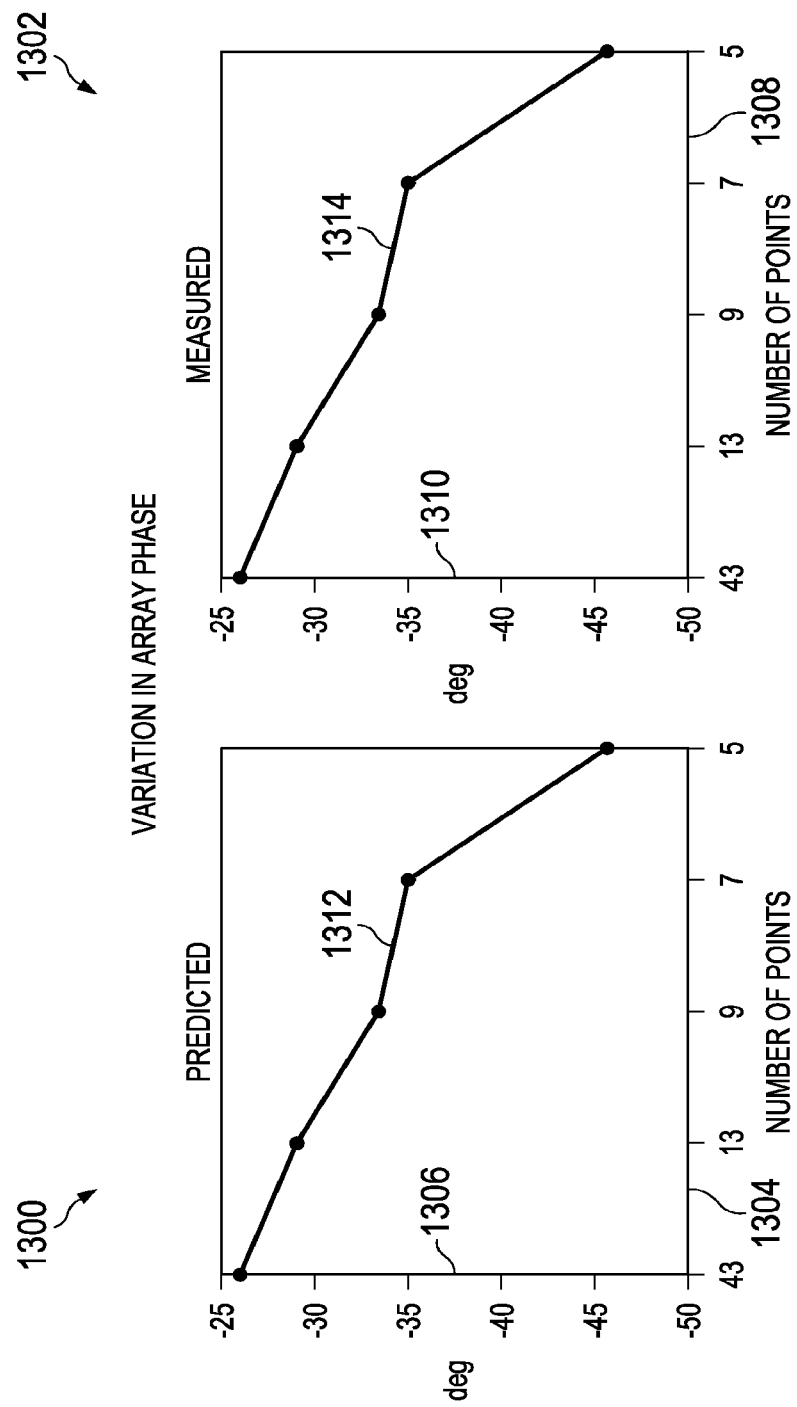
FIG. 13 is an illustration of a comparison of graphs for phase in accordance with an illustrative embodiment.

With reference now to FIG. 13, an illustration of a comparison of graphs for phase is depicted in accordance with an illustrative embodiment. In this illustrative example, graph 1300 has horizontal axis 1304 and vertical axis 1306. Graph 1302 has horizontal axis 1308 and vertical axis 1310.

Both horizontal axis 1304 and horizontal axis 1308 represent a number of sensors in the sensor system associated with the phased array antenna. Both vertical axis 1306 and vertical axis 1310 represent the phase selected for the phased array antenna, in degrees.

However, curve 1312 in graph 1300 identifies the phase when estimated deformation data generated by a trained heuristic model is used to adjust the phase for the phased array antenna. Curve 1314 in graph 1302 identifies the phase when actual deformation data is used to adjust the phase for the phased array antenna. As depicted, these curves indicate that the phase selected for the phased array antenna based on the estimated deformation data is within selected tolerances of the phase selected for the phased array antenna based on the actual deformation data.

Figure 14:
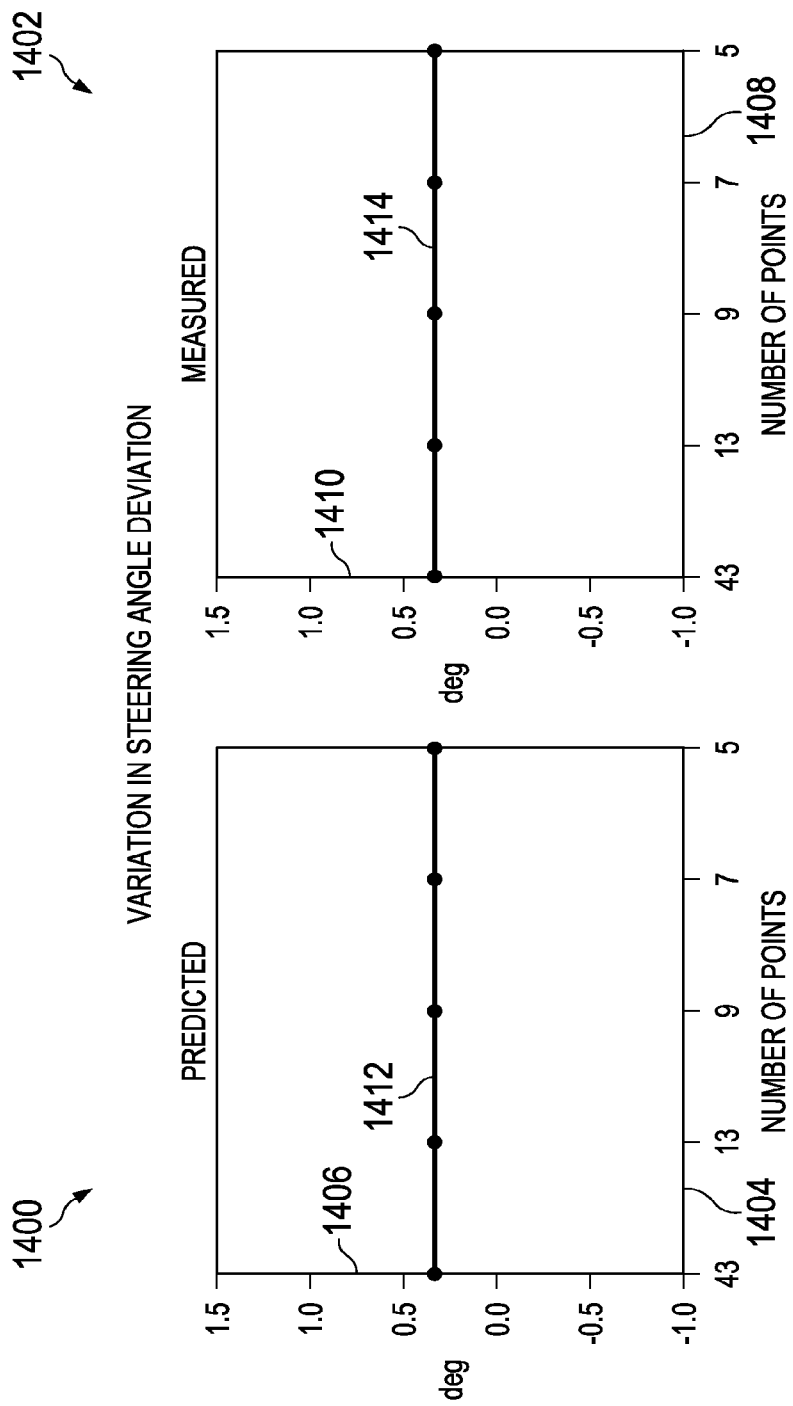
FIG. 14 is an illustration of a comparison of graphs for beam steering angle deviation in accordance with an illustrative embodiment.

With reference now to FIG. 14, an illustration of a comparison of graphs for beam steering angle deviation is depicted in accordance with an illustrative embodiment. In this illustrative example, graph 1400 has horizontal axis 1404 and vertical axis 1406. Graph 1402 has horizontal axis 1408 and vertical axis 1410.

Both horizontal axis 1404 and horizontal axis 1408 represent a number of sensors in the sensor system associated with the phased array antenna. Both vertical axis 1406 and vertical axis 1410 represent the beam steering angle deviation for the phased array antenna, in degrees.

However, curve 1412 in graph 1400 identifies the beam steering angle deviation when estimated deformation data generated by a trained heuristic model is used to adjust the phase and/or amplitude for the phased array antenna. Curve 1414 in graph 1402 identifies the beam steering angle deviation when actual deformation data is used to adjust the phase and/or amplitude for the phased array antenna.

As depicted, these curves indicate that the beam steering angle deviation for the phased array antenna based on the estimated deformation data is within selected tolerances of the beam steering angle deviation for the phased array antenna based on the actual deformation data. In other words, the beam steering angle deviation for the phased array antenna when the phased array antenna is electronically compensated using the estimated deformation data, and the beam steering angle deviation for the phased array antenna when the phased array antenna is electronically compensated using the actual deformation data may be substantially equal within selected tolerances.

The illustrations of graphs 1100 and 1102 in FIG. 11, graphs 1200 and 1202 in FIG. 12, graphs 1300 and 1302 in FIG. 13, and graphs 1400 and 1402 in FIG. 14 are not meant to imply physical or architectural limitations to the manner in which an illustrative embodiment may be implemented. The data presented in these graphs is with respect to only one possible implementation for a structure, a sensor system associated with that structure, and a heuristic model used to estimate deformation of the structure.

Figure 15:
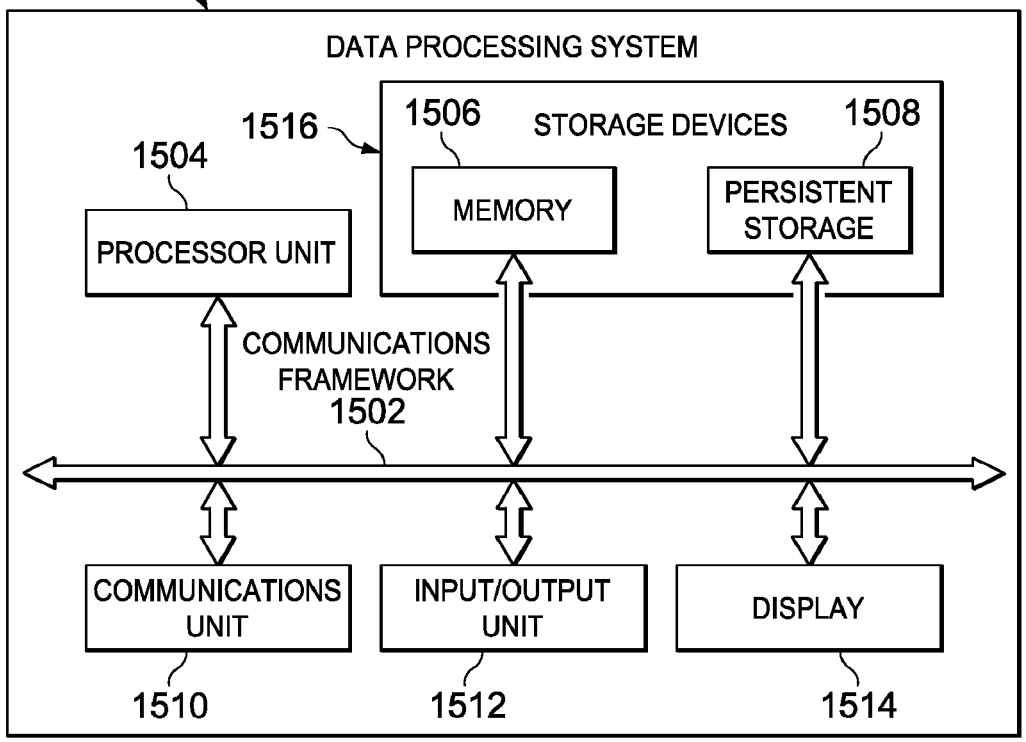
FIG. 15 is an illustration of a data processing system in accordance with an illustrative embodiment.
Figure 15:
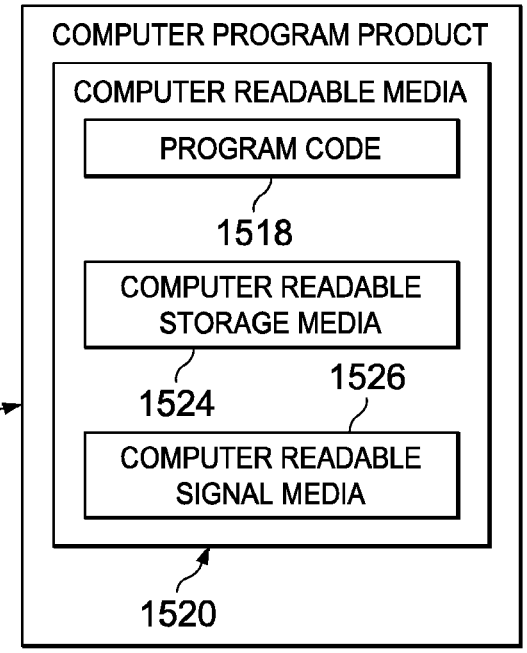

Turning now to FIG. 15, an illustration of a data processing system is depicted in accordance with an illustrative embodiment. Data processing system 1500 may be used to implement computer system 122 in FIG. 1 and/or computer system 202 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In these examples, communications frame work 1502 may be a bus system.

Processor unit 1504 serves to execute instructions for software that may be loaded into memory 1506. Processor unit 1504 may be a number of processors, a multi-processor core, or some other type of processor, depending on the particular implementation. Further, processor unit 1504 may be implemented using a number of heterogeneous processor systems in which a main processor is present along with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable types of information either on a temporary basis and/or a permanent basis. Storage devices 1516 may also be referred to as computer readable storage devices in these examples. Memory 1506, in these illustrative examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of physical and/or wireless communications links.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500. In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in these illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications framework 1502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1506, or a cache, such as found in an interface and memory controller hub that may be present in communications framework 1502.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a heuristic model configured to generate estimated deformation data for a structure based on input strain data; and
   a trainer configured to identify training deformation data and training strain data for each training case in a plurality of training cases, train the heuristic model using the training deformation data and the training strain data identified for the each training case in the plurality of training cases such that the heuristic model generates the estimated deformation data for the structure based on the input strain data in which the estimated deformation data has a desired level of accuracy, and receive the training strain data for the each training case in the plurality of training cases from a sensor system associated with the structure in which the sensor system comprises a plurality of sensors positioned at a plurality of points on the structure in which the plurality of sensors is configured to generate a plurality of strain measurements for the plurality of points on the structure.

2. The apparatus of claim 1, wherein the heuristic model is configured to adjust a group of parameters for the heuristic model using the training deformation data and the training strain data for the each training case in the plurality of training cases such that the estimated deformation data generated by the heuristic model based on the input strain data has the desired level of accuracy.

3. The apparatus of claim 1, wherein the heuristic model comprises at least one of a neural network, a learning-based algorithm, a regression model, a support vector machine, a data fitting model, and a pattern recognition model.

4. The apparatus of claim 1, wherein the structure is associated with a platform and wherein the estimated deformation data generated by the heuristic model is used to adjust a group of control parameters for the structure during operation of the platform such that the structure has a desired level of performance during the operation of the platform.

5. An antenna deformation modeling system comprising:
   a phased array antenna;
   a sensor system comprising a plurality of sensors embedded at a plurality of points in the phased array antenna, the plurality of sensors configured to generate strain data for the phased array antenna in a plurality of training cases, in which the plurality of sensors is configured to generate a plurality of strain measurements for the plurality of points on the phased array antenna; and
   a trainer configured to identify training deformation data and training strain data for each training case in the plurality of training cases, train a heuristic model using the training deformation data and the training strain data identified for the each training case in the plurality of training cases such that the heuristic model generates an estimated deformation data for the phased array antenna based on the input strain data, and receive the training strain data for the each training case in the plurality of training cases from the sensor system.

6. The antenna deformation modeling system of claim 5, further comprising an imaging system configured to generate a number of images of the structure.

7. The antenna deformation modeling system of claim 6, wherein the imaging system comprises a number of cameras configured to generate the number of images, the number of images including a number of deformation measurements at the plurality of points on the phased array antenna, the number of deformation measurements corresponding to the training deformation data.

8. The antenna deformation modeling system of claim 5 further comprising an actuator system configured to apply a number of loads on the phased array antenna for the plurality of training cases.

9. The antenna deformation modeling system of claim 8, wherein the actuator system comprises a plurality of actuators configured to apply the number of loads to a plurality of points on the phased array antenna.

10. The antenna deformation modeling system of claim 5, wherein the phased array antenna is associated with an aircraft and deforms while the aircraft is in flight such that a shape of the phased array antenna changes from a reference shape to a deformed shape.

11. The antenna deformation modeling system of claim 5, wherein the estimated deformation data has a desired level of accuracy.

12. A system for identifying deformation of a structure, comprising:
    a sensor system associated with the structure and comprising a plurality of sensors positioned at a plurality of points on the structure generating strain data for the structure, in which the plurality of sensors is configured to generate a plurality of strain measurements for the plurality of points on the structure;
    an actuator system configured to apply a number of loads on the structure for a number of training cases;
    an imaging system configured to generate a number of images of the structure receiving the number of loads; and
    a computer system comprising a trainer configured to receive the strain data for each of the number of training cases from the sensor system and train a heuristic model using the strain data and the number of images.

13. The system of claim 12, wherein the structure comprises a phased array antenna.

14. The system of claim 13, wherein the actuator system comprises a plurality of actuators configured to apply the number of loads to a plurality of points on the phased array antenna.

15. The system of claim 14, wherein the imaging system comprises a number of cameras configured to generate the number of images, the number of images including a number of deformation measurements at the plurality of points on the phased array antenna.

16. The system of claim 12, wherein the sensor system comprises a plurality of strain gauges embedded in the structure.

17. The system of claim 12 further comprising a support system supporting the structure.

18. The system of claim 12, wherein the trainer is configured to train the heuristic model to estimate a deformation of the structure.

19. The system of claim 12, wherein the heuristic model comprises at least one of a neural network, a learning-based algorithm, a regression model, a support vector machine, a data fitting model, and a pattern recognition model.

* * * * *